(No Model.) 2 Sheets—Sheet 1.

A. A. HOLT.
VEHICLE RUNNING GEAR.

No. 589,127. Patented Aug. 31, 1897.

Witnesses:
A. C. Harmon
Thomas J. Drummond

Inventor:
Albert A. Holt
by Crosby Gregory attys.

(No Model.) 2 Sheets—Sheet 2.

A. A. HOLT.
VEHICLE RUNNING GEAR.

No. 589,127. Patented Aug. 31, 1897.

Witnesses:
A. C. Harmon
Thomas J Drummond

Inventor.
Albert A. Holt.
by Crosby & Gregory attys.

UNITED STATES PATENT OFFICE.

ALBERT A. HOLT, OF FITCHBURG, MASSACHUSETTS.

VEHICLE RUNNING-GEAR.

SPECIFICATION forming part of Letters Patent No. 589,127, dated August 31, 1897.

Application filed January 4, 1897. Serial No. 617,870. (No model.)

*To all whom it may concern:*

Be it known that I, ALBERT A. HOLT, of Fitchburg, county of Worcester, State of Massachusetts, have invented an Improvement in Vehicle Running-Gears, of which the following description, in connection with the accompanying drawings, is a specification, like letters on the drawings representing like parts.

My present invention is an improvement on my previous invention, covered in United States Patent No. 571,764, and has for its object the provision of a running-gear that is more freely movable laterally than my patented device, and particularly that yields readily to a lateral depression of the vehicle-body and permits the use of the usual elliptical spring and head-block support therefor.

In low-down wagons, such as are commonly used for milk-delivery, having a drop-body hanging down between the front and rear wheels, it is desirable that there should be a comparatively free transversely pivotal or twisting movement capable between the front wheels and the body—such a movement, for instance, as would be occasioned by the driver's suddenly stepping onto the step at the side of the vehicle-body or by driving one wheel over a large stone. My invention makes provision for this movement. Also it is quite desirable to employ the usual axle, fifth-wheel, and head-block arrangement with the spring on the head-block, as this construction possesses many advantages of movement, simplicity, and appearance, and it is therefore a further main object of my invention to make it possible to use this old style of gear with low-down wagons, while at the same time maintaining the requisite ease and freedom of movement.

The details of my invention and further advantages thereof will be fully set forth by the following description, and the invention will be defined in the claims.

Figure 1:
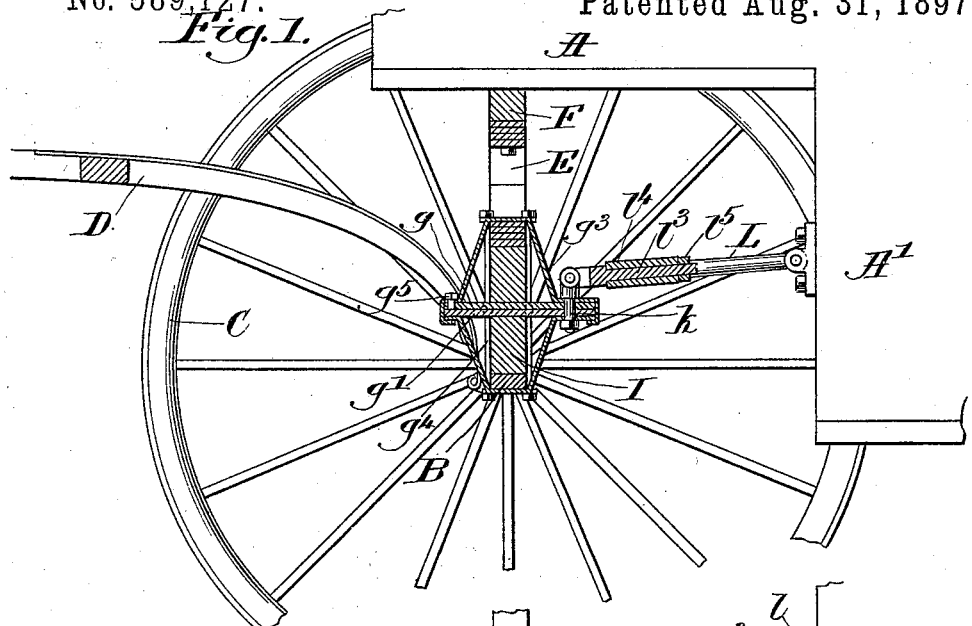
Figure 2:
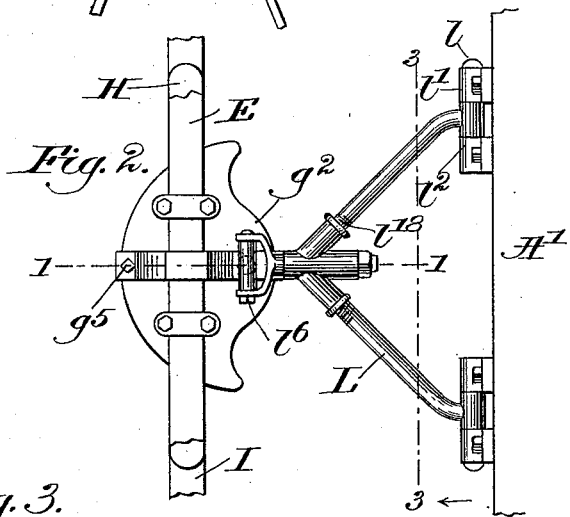
Figure 3:
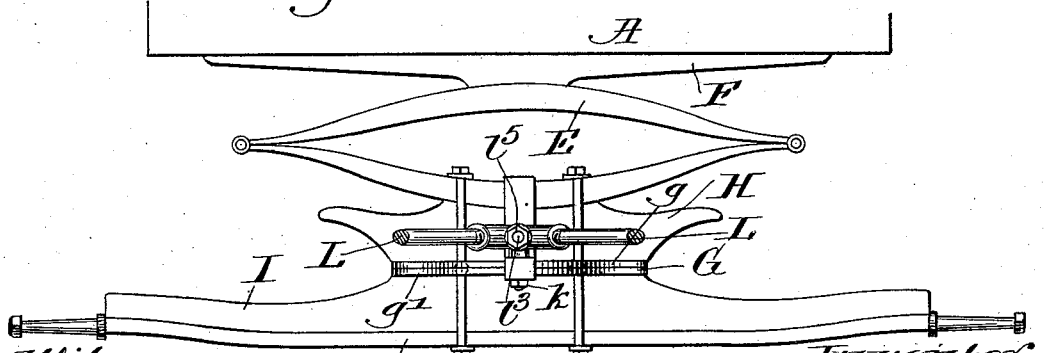
Figure 4:
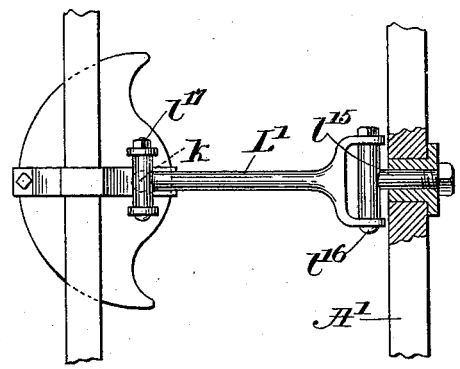
Figure 5:
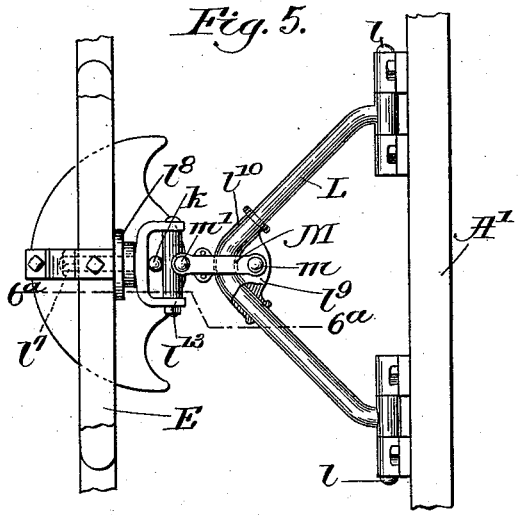
Figure 7:
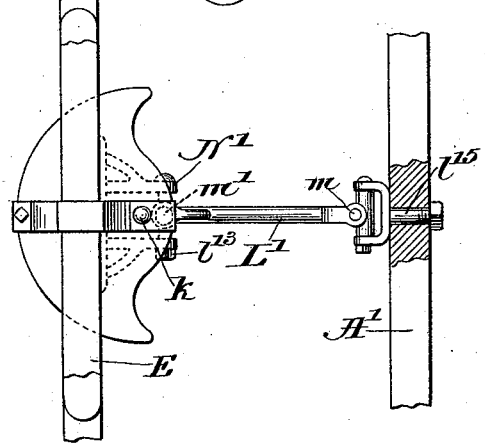
Figure 6:
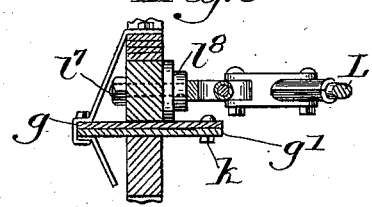

In the drawings, Figure 1 is a central cross-sectional view taken on the line 1 1, Fig. 2, showing one form of my invention applied in operative position. Fig. 2 is a top plan view thereof, the main body being removed and the spring broken away for clearness. Fig. 3 is a sectional view on line 3 3, Fig. 2, showing the main parts of the running-gear in rear elevation. Figs. 4, 5, and 7 are similar top plan views showing different embodiments of my invention to be hereinafter referred to. Fig. 6 is a sectional elevation of details of Fig. 5.

In the drawings the vehicle-body A, having a drop A', an axle B for the front wheels C, shafts D, mounted for low draft, and a spring E, connected to the body A by a cross-cleat or spring-bar F and mounted on the fifth-wheel G by a head-block H, are of any usual or preferred construction.

The fifth-wheel is shown in Fig. 1 as mounted on an axle-bed I, and preferably consists of two segmental plates $g$ $g'$, having central rear pivotal extensions $g^2$, in which a king-bolt K is mounted. Straps $g^3$ $g^4$ brace the parts, the former lapping over the edges of the plates $g$ $g'$ (see Fig. 1) and being secured at the front by a bolt $g^5$ and at the rear by the king-bolt.

L designates a reach, preferably forked and pivotally attached to the drop-body A' by suitable means, as by horizontal pintles $l$ in ears $l'$ $l^2$, although a single reach L' may be employed, if desired, as shown in Figs. 5 and 7.

In order to permit the desired rocking or relative twisting movement between the body A' and the wheels and axle, I mount the reach L about midway of the height of the drop-body A', as in Fig. 1, where it is shown as slightly inclined forward, and provide a longitudinal pivot connection for the front end of the reach and consisting in Figs. 1 to 3 of a bolt $l^3$, adjusted within a socket $l^4$ by a nut $l^5$, threaded on its free end and horizontally pivoted at $l^6$ to the king-bolt K. By this construction if a person should jump upon the lower edge or step of the drop-body A', or if one wheel should ride over an obstruction, the reach L would readily rock on its pivot $l^3$ without any jerk or strain whatever.

In some instances it is desirable to provide still greater freedom of lateral yield or "rocking movement," as I have termed it, and accordingly I provide a vertical pivotal connection either alone or supplemental to the longitudinal horizontal pivot, as above described in connection with $l^3$ $l^4$.

Referring to Fig. 5, it will be seen that the longitudinal pivot comprises a bolt $l^7$, similar to the bolt $l^3$, having its bearing $l^8$ in the head-block, the king-bolt in this instance not being shown as connected to the longitudinal pivot and the latter having connection to the reach L by means of a link or hanger M, mounted at its ends on the vertical pivots mentioned, these consisting of a bolt $m$, passed through a web $l^9$ at the rear of the casting $l^{10}$, and a bolt $m'$, passed through an ear of a a horizontal pivot-bearing $l^{12}$, which supports a pintle $l^{13}$, carried by the bolt $l^7$. This construction permits universal yielding movement between the running-gear and the vehicle-body.

It will be seen that Fig. 5 comprises the transverse horizontal pivot connections at $l$ $l^{13}$, the longitudinal horizontal pivot connection at $l^7$, the vertical pivot connection at $m$ $m'$, and also the king-bolt connection at $k$. These all coöperate and are preferably all used together, each having its separate and peculiar function to perform, although one and another may be omitted, if desired, and still effect novel and beneficial results, and they may be variously combined and arranged to advantage. This arrangement permits the wheels or the body to yield laterally to any sudden movement, and thereby maintain a smoothness and ease of general movement of the vehicle.

By the term "fifth-wheel" I mean to include any turning arrangement—such as the common rocker-plates, for instance.

While I prefer to employ the construction as already described, yet my invention is not limited thereto. With the single-reach construction L', Figs. 5 and 7, the longitudinal pivot $l^{15}$ is shown as at the rear end of the reach, having its bearing in the drop-body A'.

In Fig. 7 the vertical pivots $m$ $m'$ are provided directly in connection with the reach, the hanger M being omitted, and the reach being pivoted at $l^{13}$ in a bracket N'.

Fig. 4 shows the reach L' as horizontally pivoted at $l^{16}$ and connected at its forward end directly to the king-bolt by a horizontal pivot $l^{17}$, the movement being similar to that of Fig. 1.

The reach may be tapped into a casting, as shown at $l^{18}$, Fig. 2, or it may be a one-piece rod bent and clamped between two castings, as shown in Figs. 5 and 6.

I have herein shown the preferred embodiments of my invention, but I do not limit myself thereto, inasmuch as many changes in form, arrangement, and details of construction may be resorted to without departing from the spirit and scope of my invention.

In my Figs. 1 and 2 I get pivotal side swinging movement, such as would be occasioned by the sudden lifting or lowering of one of the front wheels or by stepping heavily onto the side of the low-down body of the vehicle by means of the longitudinal horizontal pivot $l^3$ in connection with the vertical pivot $k$ and pivot $l^6$, and in Fig. 5 the said movement is secured by introducing a short link or hanger M between the laterally immovable reach L and the axle or head block, this link being claimed in another application, Serial No. 639,647.

The forked rigid reach as arranged gives steadiness and precision of draft, especially in turning the vehicle.

Having described my invention, what I claim as new, and desire to secure by Letters Patent, is—

1. The combination with a vehicle-body, and its running-gear, of a longitudinal horizontal pivot connection and also a vertical pivot connection coöperating with said horizontal pivot connection, and both between said body and running-gear, substantially as described.

2. A forked reach comprising a single bar bent at its middle, its divergent ends terminating in hinge members, and its angular middle portion clamped between castings provided therefor, substantially as described.

3. In a vehicle running-gear, the combination with a forked reach consisting of a single bar bent at its middle, said reach at its angular middle portion being clamped between opposite castings having a web at their rear inner side, of a link connection between the forward bent end of said reach and the front running-gear of the vehicle, said link having a vertical pivot at each end, its rear pivot being located in said web, substantially as described.

In testimony whereof I have signed my name to this specification in the presence of two subscribing witnesses.

ALBERT A. HOLT.

Witnesses:
GEO. H. MAXWELL,
JOHN C. EDWARDS.